United States Patent
Kiani

(10) Patent No.: US 6,547,445 B2
(45) Date of Patent: Apr. 15, 2003

(54) HIGH-DENSITY FIBER OPTIC BACKPLANE

(75) Inventor: Sepehr Kiani, Watertown, MA (US)

(73) Assignee: Teradyne, Inc., Boston, MA (US)

( * ) Notice: Subject to any disclaimer, the term of this patent is extended or adjusted under 35 U.S.C. 154(b) by 268 days.

(21) Appl. No.: 09/777,412

(22) Filed: Feb. 6, 2001

(65) Prior Publication Data

US 2002/0106161 A1 Aug. 8, 2002

(51) Int. Cl.[7] .............................................. G02B 6/36
(52) U.S. Cl. .................................. 385/53; 385/76
(58) Field of Search .............................. 385/53, 55, 75, 385/76, 89

(56) References Cited

U.S. PATENT DOCUMENTS

| | | | |
|---|---|---|---|
| 4,904,036 A | 2/1990 | Blonder | 350/96.11 |
| 5,073,000 A | 12/1991 | Derfiny | 385/14 |
| 5,204,925 A | 4/1993 | Bonanni et al. | 385/89 |
| 5,283,851 A | 2/1994 | Vergnolle | 385/134 |
| 5,394,503 A | 2/1995 | Dietz, Jr. et al. | 385/135 |
| 5,425,831 A | 6/1995 | Grimes et al. | 156/179 |
| 5,513,293 A | 4/1996 | Holland et al. | 385/134 |
| 6,005,991 A | 12/1999 | Knasel | 385/14 |
| 6,041,652 A | 3/2000 | Stewart | 73/504.04 |
| 6,233,376 B1 | 5/2001 | Updegrove | 385/14 |
| 6,259,840 B1 | 7/2001 | Munoz-Bustamante et al. | 385/39 |
| 6,270,262 B1 | 8/2001 | Hudgins et al. | 385/88 |
| 6,304,690 B1 | 10/2001 | Day | 385/24 |
| 6,305,848 B1 | 10/2001 | Gregory | 385/53 |
| 6,419,399 B1 | 7/2002 | Loder et al. | 385/53 |

FOREIGN PATENT DOCUMENTS

| | | | |
|---|---|---|---|
| EP | 0813 083 A1 | 12/1997 | G02B/6/43 |
| WO | WO 99/13367 | 3/1999 | G02B/6/26 |

OTHER PUBLICATIONS

International Search Report from International Application No. PCT/US 02/03316, filed Feb. 5, 2002, 6 pages.

Primary Examiner—Khiem Nguyen
(74) Attorney, Agent, or Firm—Chapin & Huang, L.L.C.; David E. Huang, Esq.

(57) ABSTRACT

A fiber optic backplane has a casing portion and multiple fiber optic ribbons that extend from the same location of the casing portion. Such a backplane is well-suited for high density connections and can operate without significant light energy loss. One arrangement includes multiple optical fibers, a casing and a set of ribbon coatings. The casing holds casing portions of the optical fibers. The set of ribbon coatings holds ribbon portions of the optical fibers in rows to form multiple optical fiber ribbons. Each ribbon coating of the set of ribbon coatings attaches to the casing at a same location of the casing such that the optical fiber ribbons extend from the same location of the casing. The multiple optical fiber ribbons which extend from the same casing location enable higher optical fiber densities than conventional fiber optic backplanes which only have parallel ribbon portions extending from different locations (e.g., centimeters apart) of a central backplane portion.

17 Claims, 13 Drawing Sheets

HIGH-DENSITY FIBER OPTIC BACKPLANE

BACKGROUND OF THE INVENTION

A typical fiber optic backplane includes a network of optical fibers. Typically, each optical fiber conveys light signals (pulses of light) from one location of the backplane to another.

One conventional fiber optic backplane includes a rectangle-shaped central portion, and multiple ribbon portions which extend in parallel from one side of the central portion. Optical fibers within each ribbon portion continue through the central portion and out through one or more other ribbon portions. Accordingly, when the fiber optic backplane is in operation, light signals sent through fibers of one ribbon portion continue within those fibers through the central portion and out one or more of the other ribbon portions.

The central portion of the fiber optic backplane typically includes (i) an outer covering which resembles a plastic laminate, (ii) portions of optical fibers, and (iii) an adhesive fluid that tends to prevent movement of the optical fibers within the outer covering. The ribbon portions of the fiber optic backplane typically include portions of the same outer covering used in the central portion, and portions of optical fibers running therebetween. The outer covering and fluid holds the optical fibers in place and tends to prevent their movement among each other.

To form the fiber optic backplane, a manufacturer typically lays down an adhesive-backed sheet of the outer covering to form a bottom layer of the backplane. Next, the manufacturer runs portions of optical fibers over that sheet along desired optical fiber paths. Then, the manufacturer adds the fluid and lays down another sheet of the outer covering to form a top layer of the backplane. Finally, the manufacturer seals the top and bottom sheets together (e.g., by applying heat) and cuts the sheets to form the central portion and the connected ribbon portions. The fiber optic backplane, which is soft and flexible, can then be clipped to a rigid board and connected between multiple fiber optic components (e.g., circuit boards, fiber optic cables, etc.) to convey light signals among the components.

When two optical fibers cross over each other, one of the optical fibers typically bends around the other. The light energy loss through the bent optical fiber increases as the bend radius of at optical fiber increases (i.e., the sharper the bend, the more light energy loss). Since the effectiveness of fiber optic signal detection circuitry (e.g., light sensing circuitry) is best when light energy loss is minimal, manufacturers try to limit the number of optical fibers crossing over each other at any single point in the backplane. To this end, fiber optic backplane manufacturers typically arrange the portions of optical fibers within each ribbon portion in rows to prevent the optical fibers from crossing over each other within that ribbon portion, and position all of the optical fiber cross-over occurrences in the central portion. Additionally, manufacturers try to limit the number (e.g., less than eight) of optical fibers crossing at any one point in the central portion since a high number of optical fibers crossing over each other at a particular point tends to result in more severely bent fibers (i.e., the optical fiber at the top tends to have the sharpest bend and typically experiences the most light energy loss). Furthermore, manufacturers attach the ribbon portions to the central portion far enough apart from each other (e.g., several centimeters) so that light energy loss due to optical fibers bending within the central portion from one ribbon portion to another is not excessive.

Insulated optical fibers (e.g., individual rubber protected optical fibers) typically extend individually from the far ends of the ribbon portions of the fiber optic backplane. Each optical fiber typically terminates at a respective fiber optic connector that provides the optical fiber end as an optical interface for forming a fiber optical connection with the end of another optical fiber. Typically, the fiber optic backplane connectors employ rigid elbow-shaped (e.g., 90 degree arc) strain reliefs. Accordingly, a technician can easily mate and un-mate the fiber optic connectors with other fiber optic connectors (e.g., corresponding fiber optic connectors mounted to a rigid board) to form individual fiber optic connections with other components.

SUMMARY OF THE INVENTION

Unfortunately, there are deficiencies to the above-described conventional fiber optic backplane. In particular, the number of fibers through the backplane (e.g., the number of fibers in a particular ribbon portion, the number of fibers in a terminating connector, etc.) is relatively low since the density of the backplane is limited by the number of fibers crossing over each other in the central portion. If there are too many fibers crossing over each other in the fluid-filled central portion at a particular point, some of the optical fibers passing through the central portion will tend to be pulled by the laminate and any external forces. In particular, the fibers on top (i.e., the top fibers on cross-overs of many fibers) will tend to be pulled down the most. In some situations the fibers will bend sharply resulting in excessive light energy loss.

Furthermore, density is low since the ribbons are disposed side-by-side from the central portion thus limiting the number of fibers in the ribbons to the available edge length of the central portion. This deficiency makes scaling difficult.

Additionally, in some situations, density is low due to restrictions on how close the ribbons can be placed next to each other. For example, if the ribbon portions of the backplane are too close together, the fibers may be forced to bend sharply within the central portion and result in excessive light energy loss. Also, the manufacturer may need to provide certain clearances between ribbon portions in order to properly cut the laminate (e.g., clearance that allow a laser to cut out the ribbon portions).

Furthermore, the termination of the ribbon portions with individual fiber optic connectors holding single fiber ends limits the fiber optic backplane to low density applications. That is, the fiber optic backplane is poorly suited for more complex routing situations that require many fibers running in many different directions. The alternative is for a technician to connect and/or combine multiple fiber optic backplanes, or to use a tangled network of fiber optic cables that carry bundles of optical fibers (in place of the fiber optic backplane) for these more complicated connection tasks.

In contrast to the above-described conventional fiber optic backplane which has parallel ribbon portions extending from different locations of a central portion (e.g., locations that are several centimeters apart along a side of the central portion), the invention is directed to fiber optic connection techniques which use a fiber optic backplane having a casing portion and multiple fiber optic ribbons that extend from the same location of the casing portion. The invention is well-suited for higher density situations and can be implemented without significant light energy loss.

One arrangement of the invention is directed to a fiber optic backplane that includes multiple optical fibers, a casing and a set of ribbon coatings. The casing holds casing portions of the optical fibers. The set of ribbon coatings holds ribbon portions of the optical fibers in rows to form multiple optical fiber ribbons. Each ribbon coating of the set of ribbon coatings attaches to the casing at a same location of the casing such that the optical fiber ribbons extend from that same location of the casing. The multiple optical fiber ribbons which extend from the same casing location enable higher optical fiber densities than conventional fiber optic backplanes which only have parallel ribbon portions extending from different locations of a central backplane portion (e.g., locations which are centimeters apart).

In one arrangement, another set of ribbon coatings holds other ribbon portions of the optical fibers in rows to form other optical fiber ribbons. Each ribbon coating of the other set of ribbon coatings attaches to the casing at another location of the casing such that the other optical fiber ribbons extend from the other location of the casing. Accordingly, the fiber optic backplane can have multiple sets of optical fiber ribbons, e.g., a first set extending from one location, a second set extending from another location (perhaps in parallel with the first set), and so on.

In one arrangement, a cross-section of each optical fiber ribbon is substantially planar in an X-direction, and an end of each optical fiber ribbon of the multiple optical fiber ribbons is aligned in a column that extends in a Y-direction that is substantially perpendicular to the X-direction. This arrangement provides for stacking of optical fiber ribbons which is a convenient and well-organized technique for arranging the optical fibers.

In one arrangement, the casing includes a flexible polymer skin (e.g., a thick plastic coating) that is capable of elastically deforming under stress. In this arrangement, a viscous glue is preferably retained around portions of the optical fibers by the flexible polymer skin of the casing. The viscous glue assists in suspension of the optical fibers thus minimizing any bending of the optical fibers at the optical fiber cross-over points within the casing. Accordingly, there is minimal light energy loss within the casing due to optical fibers crossing over each other even when the number of optical fibers crossing over each other at a particular point is relatively high (e.g., eight or greater).

In one arrangement, the casing includes a rigid member that covers the casing portions of the optical fibers. Preferably, the rigid member of the casing defines a mounting surface onto which fiber optic components are capable of rigidly mounting. In this arrangement, fiber optic components (e.g., fiber optic connectors, fiber optic circuit boards, assorted housings and support members, etc.) have a rigid surface on which to mount.

In one arrangement, a set of fiber optic connecting members (e.g., ferrules, connectors, etc.) is coupled to the set of ribbon coatings. Each fiber optic connecting member positions ends of the ribbon portions of the optical fibers in a respective row. This arrangement enables the ends of the optical fibers to reside in higher density connectors relative to the ends of the optical fibers of a conventional fiber optic backplane which individually reside in separate connectors.

Another arrangement of the invention is directed to a fiber optic network assembly. The assembly includes fiber optic circuit boards and a fiber optic backplane that connects with the fiber optic circuit boards. Each fiber optic circuit board has a set of fiber optic circuit board connecting members. The fiber optic backplane includes multiple optical fibers, a set of ribbon coatings that holds ribbon portions of the optical fibers in rows to form multiple optical fiber ribbons, and a casing that holds casing portions of the optical fibers. Each ribbon coating of the set of ribbon coatings attaches to the casing at a same location of the casing such that the optical fiber ribbons extend from the same location of the casing. The backplane further includes a set of fiber optic backplane connecting members coupled to the set of ribbon coatings. Each fiber optic backplane connecting member positions ends of the ribbon portions of the optical fibers in a respective row and is capable of forming a set of optical connections with a corresponding fiber optic circuit board connecting member. As such, the assembly is capable of forming a computer system (with operating circuitry on the circuit boards), or at least a portion of a computer system.

Another arrangement of the invention is directed to a method for forming a fiber optic backplane. The method includes the steps of providing a support structure that defines channels, and positioning a set of ribbon coatings such that each ribbon coating of the set of ribbon coatings extends from a same channel defined by the support structure. Additionally, the method includes the step of distributing optical fibers such that ribbon portions of the optical fibers extend over the set of ribbon coatings, and support structure portions of the optical fibers extend through the channels defined by the support structure. The method further includes the step of securing the optical fibers such that (i) the set of ribbon coatings holds the ribbon portions of the optical fibers in rows to form multiple optical fiber ribbons that extend from the same channel defined by the support structure, and (ii) the support structure retains the support structure portions of the optical fibers. This method provides a simple and convenient way to manufacture the above-described fiber optic backplane in a controlled and consistent manner.

The features of the invention, as described above, may be employed in fiber optic systems, devices and methods and other computer-related components such as those manufactured by Teradyne, Inc. of Boston, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to fiber optic connection techniques using a fiber optic backplane having a casing portion and multiple fiber optic ribbons that extend from the same location of the casing portion. Such techniques are well-suited for high density connections and can be implemented without significant light energy loss. One version of the backplane is relatively flexible and can be hung or clipped to a rigid board in a conventional manner. Another version of the backplane is rigid and can support mounted components (e.g., circuit boards, other backplanes, etc.).

Figure 1:
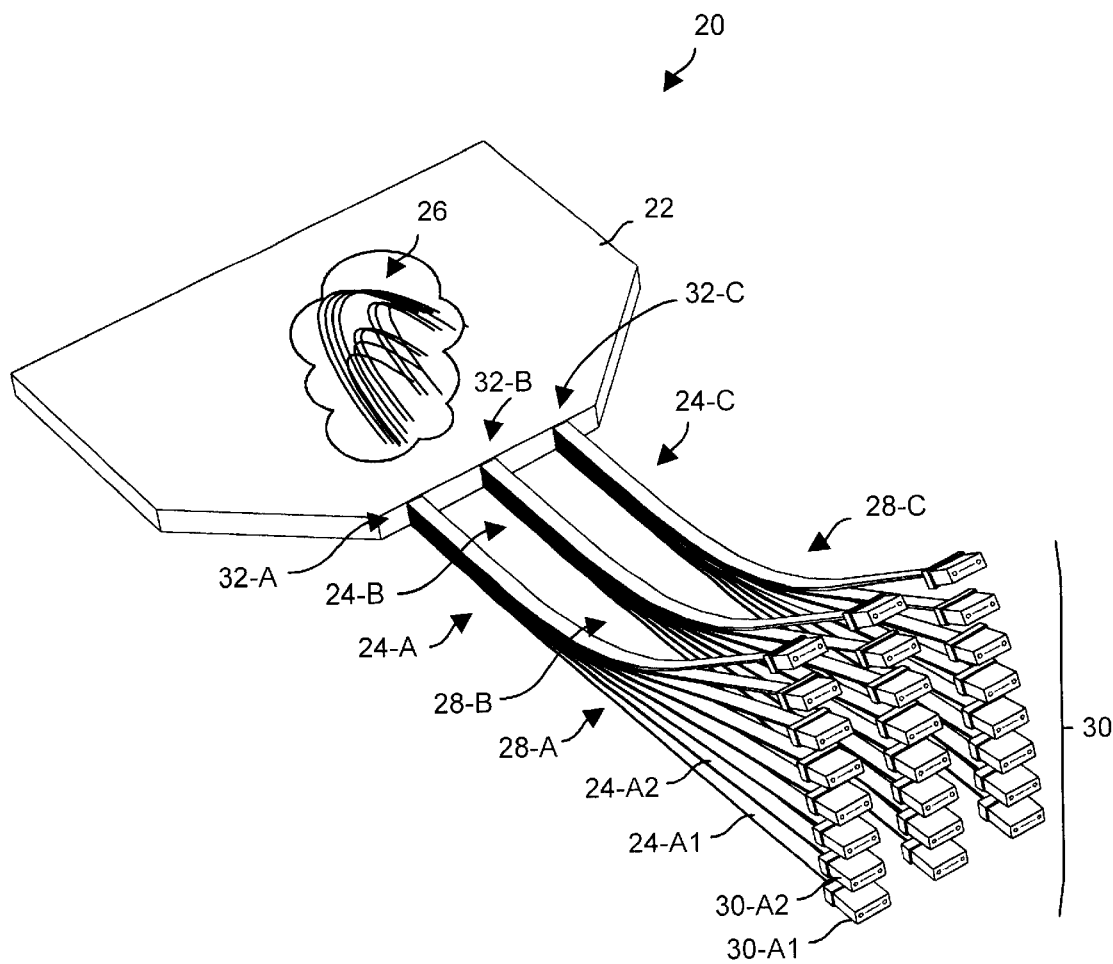
FIG. 1 is a perspective view of a flexible fiber optic backplane which is suitable for use by the invention.

FIG. 1 shows a flexible fiber optic backplane 20 which is suitable for use by the invention. The fiber optic backplane 20 includes a flexible casing 22, sets of ribbon coatings 24-A, 24-B and 24-C (collectively, ribbon coatings 24), and optical fibers 26 (some of which can be viewed through a cutaway portion of the casing 22). The ribbon coatings 24 hold ribbon portions of the optical fibers 22 in rows to form sets of optical fiber ribbons 28-A, 28-B and 28-C. In particular, and as shown by way of example only in FIG. 1, the set of ribbon coatings 24-A form optical fiber ribbons 28-A, the set of ribbon coatings 24-B form optical fiber ribbons 28-B, and the set of ribbon coatings 24-C form optical fiber ribbons 28-C.

The fiber optic backplane 20 further includes connecting members 30 (e.g., ferrules which fit into connector housings, complete connectors, etc.) which attach to the ribbon coatings 24. For example, a connecting member 30-A1 attaches to a ribbon coating 24-A1 to terminate one fiber optic ribbon, a connecting member 30-A2 attaches to another ribbon coating 24-A2 to terminate another fiber optic ribbon, and so on. Within each fiber optic ribbon reside one or more optical fibers (e.g., a row of optical fibers) which terminate at a respective connecting member 30.

As further shown in FIG. 1, the set of optical fiber ribbons 28-A extend from a location 32-A of the casing 22. The optical fiber ribbons 28-A which are stacked on top of each other and extend from a single location makes the backplane 20 well-suited for high-density configurations. In particular, the ribbons 28 are well-suited for high density connecting members 30, i.e., ferrules holding several optical fiber ends (e.g., a 1×8 array, a 1×12 array, etc.). The set of optical fiber ribbons 28-B extend from a location 32-B of the casing 22. Similarly, the set of optical fiber ribbons 28-C extend from a location 32-C of the casing 22. By way of example only, the sets of optical fiber ribbons 28-A, 28-B and 28-C run parallel to each other.

In one arrangement, the casing 22 is filled with a viscous glue that provides support to the optical fibers 26 within the casing 22. In particular, the thickness of the glue hinders bending of the optical fibers 26 at cross-over points thus preventing excessive light energy loss within the casing 22. In another arrangement, the casing 22 is filled with a hard paste, e.g., a fluid or epoxy that hardens (e.g., over time or due to heat) in order to prevent substantial bending of the optical fibers. In such an arrangement, the backplane 20 is more rigid, but preferably still somewhat malleable to enable the optical fibers to reside in a low stress state to prevent damage to the optical fibers.

A technician can use the flexible fiber optic backplane 20 to connect fiber optic components together. For example, the technician can clip the backplane to a rigid board and plug the connecting members 30 into various fiber optic components. Each set of optical fiber ribbons 28 (e.g., the set 28-A) which connects to a same location of the casing 22 (e.g., the location 32-A) provides a higher density of optical fibers than the above-described conventional fiber optic backplane that has a single ribbon extending from each location. Further details of the invention will now be explained with reference to FIG. 2.

Figure 2:
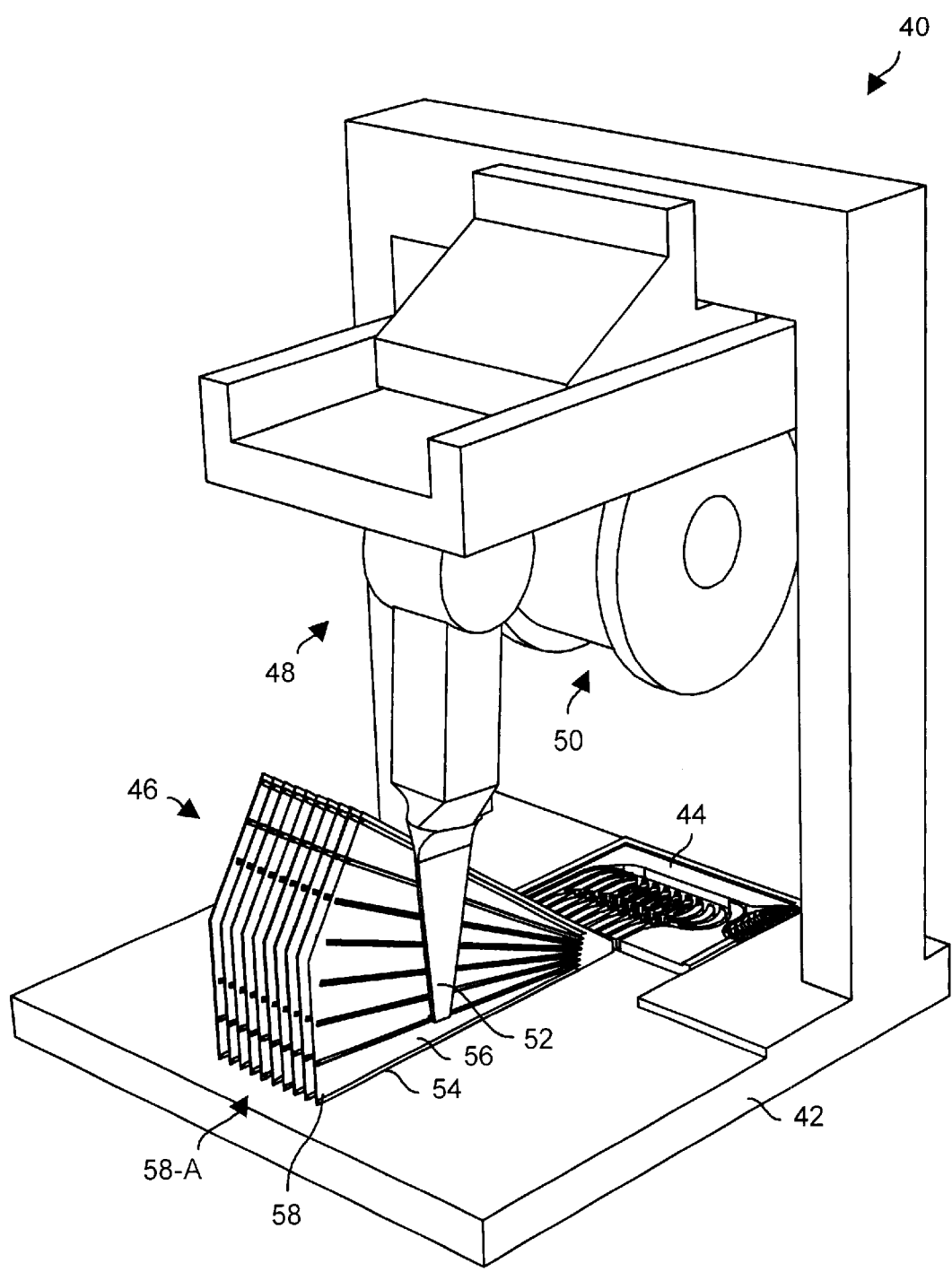
FIG. 2 is a perspective view of a manufacturing assembly which is suitable for making a fiber optic backplane.

FIG. 2 shows a manufacturing assembly 40 which is suitable for manufacturing a fiber optic backplane such as the flexible backplane 20 of FIG. 1. The manufacturing assembly 40 includes a base 42, a support structure 44, a ribbon carrying structure 46, and an optical fiber distribution mechanism 48 mounted to the base 42. The optical fiber distribution mechanism 48 includes an optical fiber supply 50 (e.g., a spool of optical fiber) and a distribution head 52.

The ribbon carrying structure 46 includes multiple ribbon carrying surfaces 54 for carrying ribbon coatings and for forming slots 56 through which the distribution head 52 can distribute optical fiber in order to form the sets of optical fiber ribbons 28 (see FIG. 1). The ribbon carrying surfaces 54 are arranged in columns 58 (e.g., see column 58-A). The optical fiber distribution mechanism 48 is capable of distributing optical fiber in any channels of the support structure 44 and in any slots 56 of the ribbon carrying structure 46. In one arrangement, the distribution mechanism 48 distributes the ribbon coatings in addition to distributing and cutting portions of optical fiber. In another arrangement, the ribbon coatings are added externally (e.g., by a technician, automated equipment, etc.). Preferably, the optical fiber distribution mechanism 48 has the flexibility to move the distribution head 52 in any direction (e.g., multiple degrees of freedom). Further details of the manufacturing assembly 40 will now be provided with reference to FIG. 3.

Figure 3:
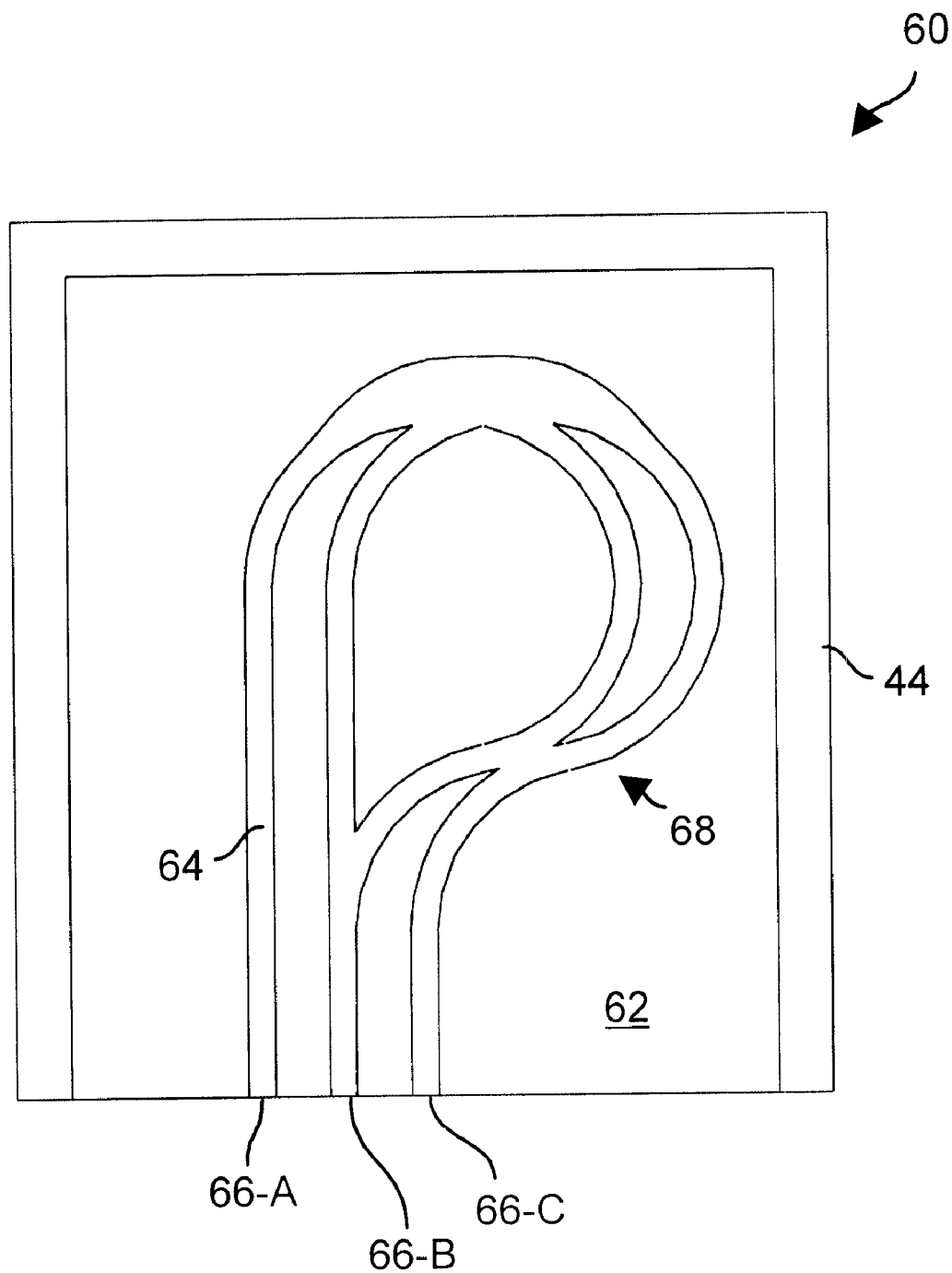
FIG. 3 is a top view of a support structure which is suitable for use by the manufacturing assembly of FIG. 2.

FIG. 3 shows a top view 60 of the support structure 44 used by the manufacturing assembly 40 of FIG. 2. The support structure 44 includes rigid material 62 (e.g., routed metal, plastic or fiberglass; molded plastic or ceramic material; etc.) which defines a set of channels 64 into which the optical fiber distribution mechanism 48 can distribute optical fiber. In particular, during operation of the manufacturing assembly 40, the optical fiber distribution mechanism 48 runs portions of optical fiber from the slots 56 of the ribbon carrying structure 46 through the channels 64 of the support structure 44 back through other slots 56 of the ribbon carrying structure 46 and cuts the optical fiber at the end of each run. During this operation, optical fiber enters and exits the channels 64 on ribbon coatings leading to the support structure 44 at locations 66-A, 66-B, and 66-C of the support structure 44. Further details of this operation will now be provided with reference to FIGS. 13 through 15.

Figure 13:
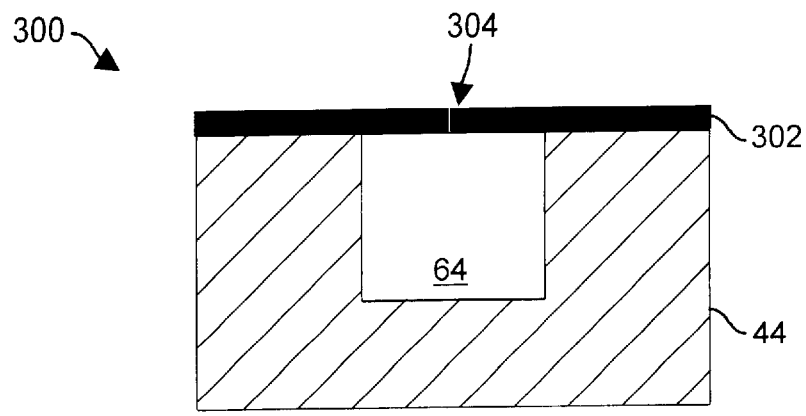
FIG. 13 is a cross-sectional side view of a portion of the support structure of FIG. 3.

FIG. 13 shows a cross-sectional side view 300 of a portion of the support structure 44. As shown, the support structure 44 defines a channel 64 and has a zero clearance film 302 that resides over the top of the support structure 44 to retain optical fibers within the channel 64 once the fibers have been placed into the channel 64. That is, the film 302 includes a zero clearance opening 304 that provides access into the channel 64. One way to provide the film 302 with such openings is to apply the film 302 as a contiguous sheet over the support structure 44, and then cut the film 302 along the centers of the channels 64.

Figure 14:
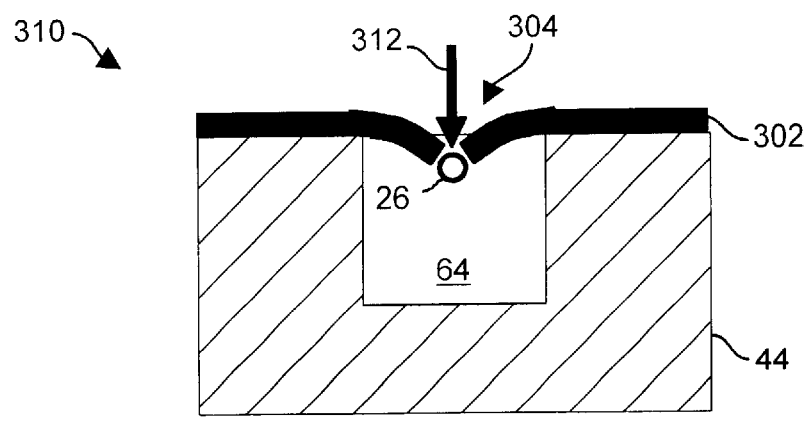
FIG. 14 is a cross-sectional side view of the portion of the support structure of FIG. 13 during insertion of an optical fiber within a channel of the support structure.

FIG. 14 shows a cross-sectional side view 310 of the portion of the support structure 44 of FIG. 13 during insertion of an optical fiber 26 within the channel of 64 the support structure 44. Such insertion is carried out by the optical fiber distribution mechanism 48 (see FIG. 2). In particular, the distribution head 52 runs along the channels 64 of the support structure 44 while inserting the optical fiber 26 into the channel 64 in the direction of the arrow 312.

Figure 15:
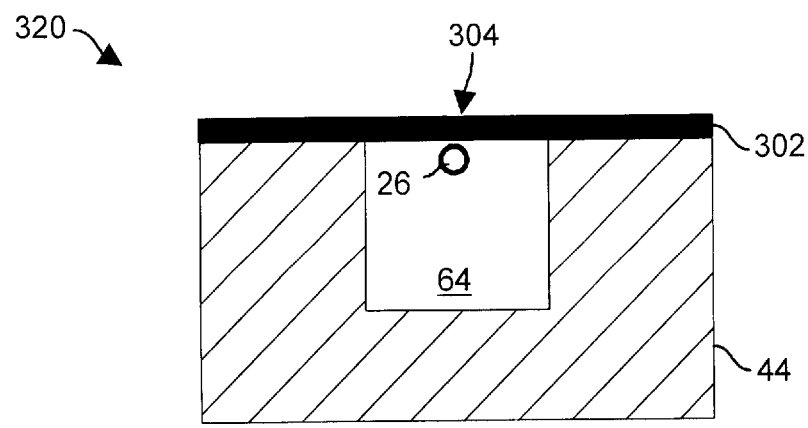
FIG. 15 is a cross-sectional side view of the portion of the support structure of FIG. 13 after insertion of the optical fiber within the channel of the support structure.

FIG. 15 shows a cross-sectional side view 320 of the portion of the support structure 44 of FIG. 13 after insertion of the optical fiber 26 within the channel 64 of the support structure 44. As shown, the zero clearance opening 304 in the film 302 closes after insertion and retains the optical fiber 26 within the channel 64.

With reference back to FIG. 3, the channels 64 provide bend radii 68 having angles that prevent excessive light energy loss in the optical fibers (e.g., bend radii greater than or equal to 26 millimeters). Preferably, each channel 64 is capable of holding many optical fibers simultaneously (the number of optical fibers capable of being held essentially being dictated by the height (i.e., depth) of the channels 64. Further details of the manufacturing assembly 40 will now be provided with reference to FIG. 4.

Figure 4:
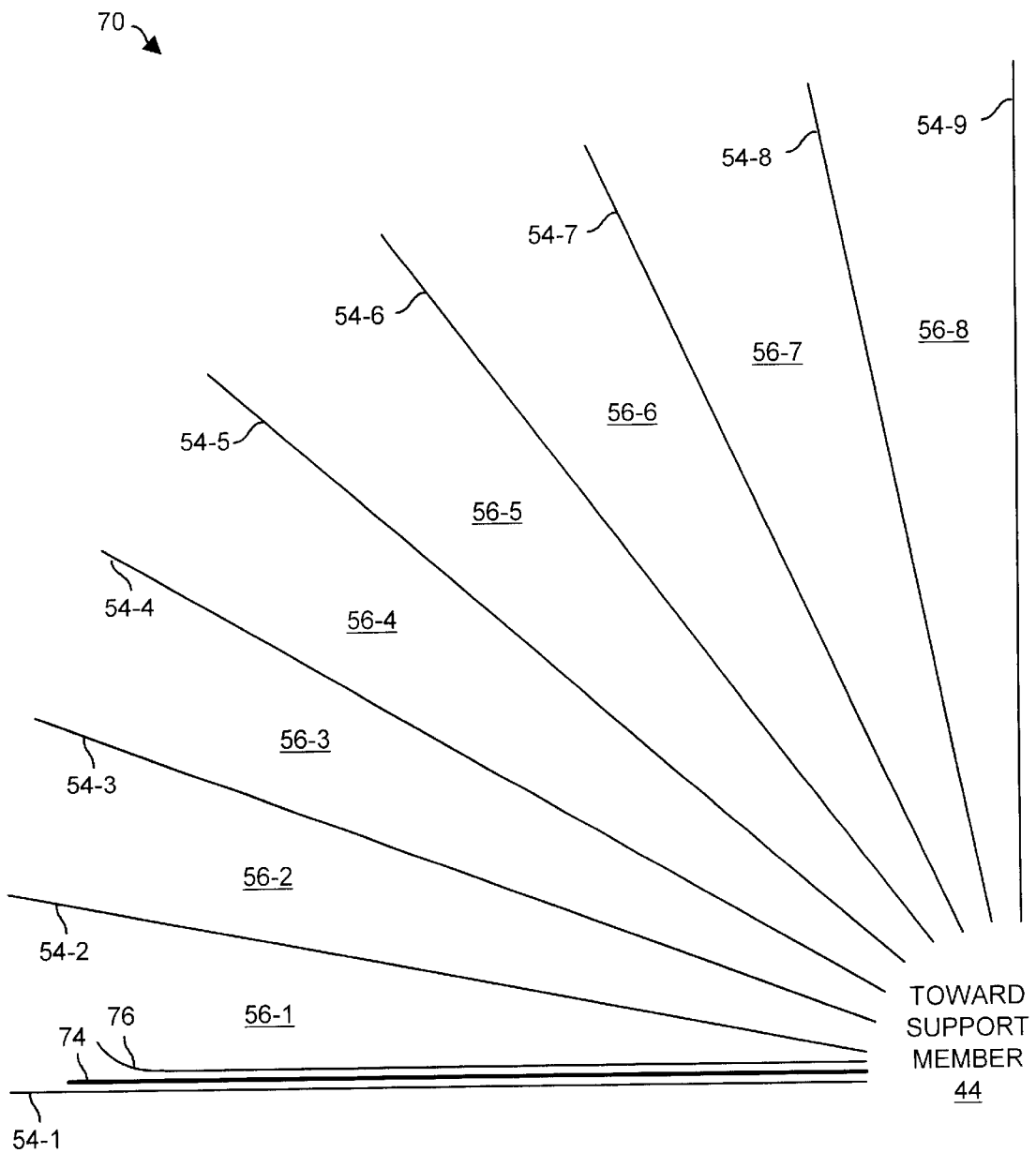
FIG. 4 is a side view of a ribbon carrying structure which is suitable for use by the manufacturing assembly of FIG. 2.

FIG. 4 shows a side view 70 of the ribbon carrying structure 46 of the manufacturing assembly 40. As mentioned earlier, the ribbon carrying structure 46 is involved in making the sets of optical fiber ribbons 28 of the fiber optic backplane 20 (see FIG. 1). As shown in FIG. 4, each of the ribbon carrying surfaces 54 extends outwardly from the support member 44. During operation, the manufacturing assembly 40 distributes a set of ribbon coatings 74 on the ribbon carrying structure 46 (e.g., in a column 58 by column 58 manner, see FIG. 2). In particular, the manufacturing assembly 40 positions a ribbon coating 74 on each of the ribbon carrying surfaces 54 (see ribbon coating 74 on the ribbon carrying service 54-1 in FIG. 3). Later in the manufacturing process, the manufacturing assembly 40 positions optical fiber over the ribbon coatings 74 (see optical fiber portion 76 on the ribbon coating 74), and top ribbon coatings to form a complete ribbon, i.e., a row of optic fiber portions 76 surrounded on the top and bottom by ribbon coatings 74. Preferably, the ribbon coatings 74 are sticky or tacky (e.g., include a layer of glue) in order to hold the optical fibers in their fixed row locations.

In one arrangement, the ribbon carrying surfaces 54 of the ribbon carrying structure 46 reside in fixed positions. That is, the ribbon carrying surfaces 54 are not movable. In this arrangement, the slots 56 are wide (i.e., tall) enough to enable the distribution head 52 (also see FIG. 2) to enter and precisely located optical fiber over each ribbon coating 74.

Figure 5:
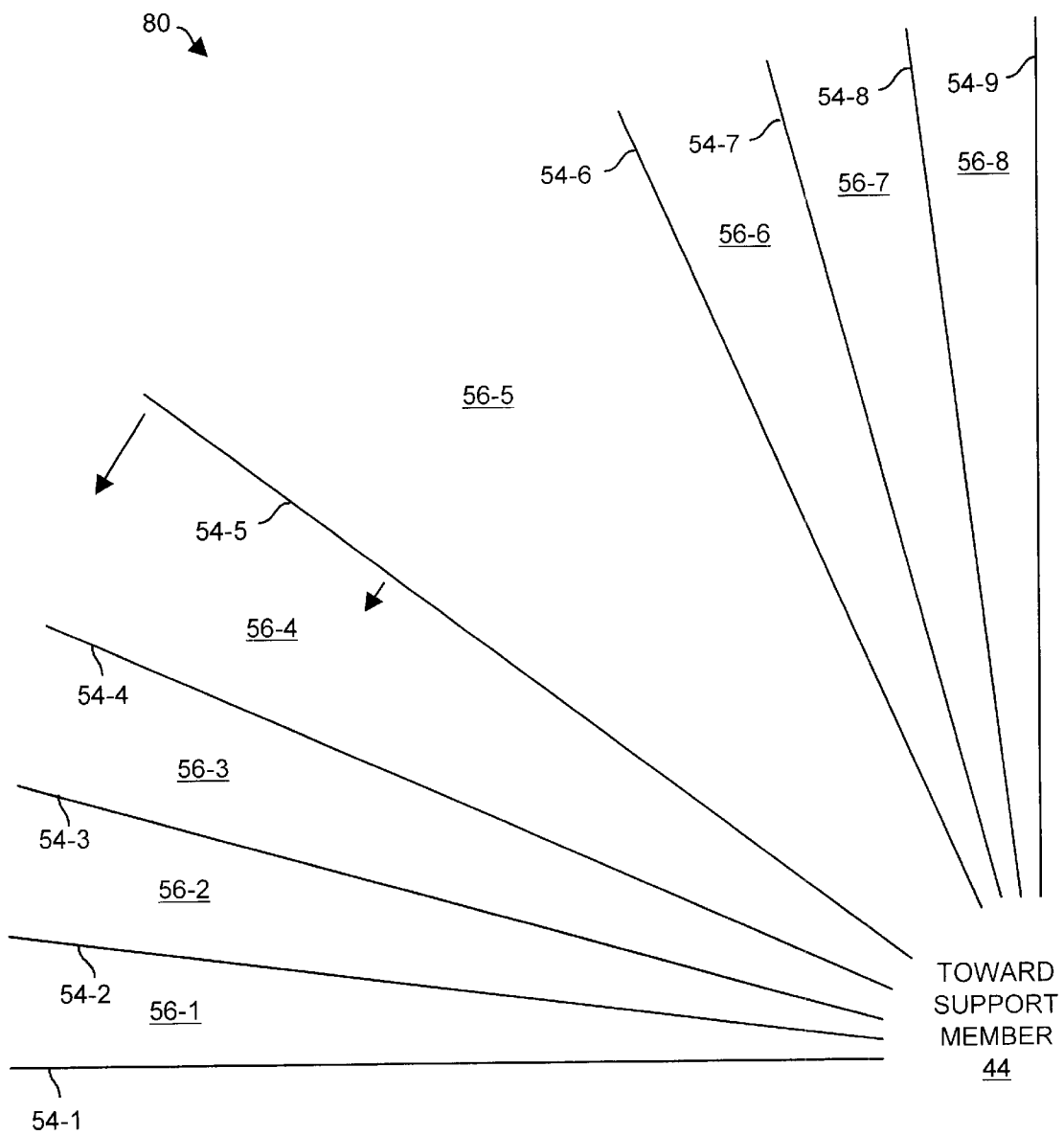
FIG. 5 is a side view of an alternative ribbon carrying structure which is suitable for use by the manufacturing assembly of FIG. 2.

In another arrangement and as shown in FIG. 5, the ribbon carrying surfaces 54 of the ribbon carrying structure 46 are movable (e.g., slidable in an up-and-down manner via automated equipment) to enable the use of many ribbon carrying surfaces 54 when manufacturing backplanes with many ribbons that attach to the same location of a backplane casing. In this arrangement, electromechanical devices move the ribbon carrying surfaces 54 to provide enough room for the distribution head 52 to properly distribute fiber optic cable, i.e., the size of the slots 56 being based on the locations of the ribbon carrying surfaces 54. By way of example only, the slot 56-5 has a relatively large size compared to the other slots 56 due to movement of the ribbon carrying surfaces 54 (illustrated by the arrows in FIG. 5). The coordination of moving ribbon carrying surfaces 54 and distribution of ribbon coatings 74 an optical fiber 76 is automatable (e.g., is controllable using software).

Once the sets of optical fiber ribbons 28 have been formed, the sets 28 extend from the support structure 44 in parallel. Further details of the invention will now be provided with reference to FIG. 6.

Figure 6:
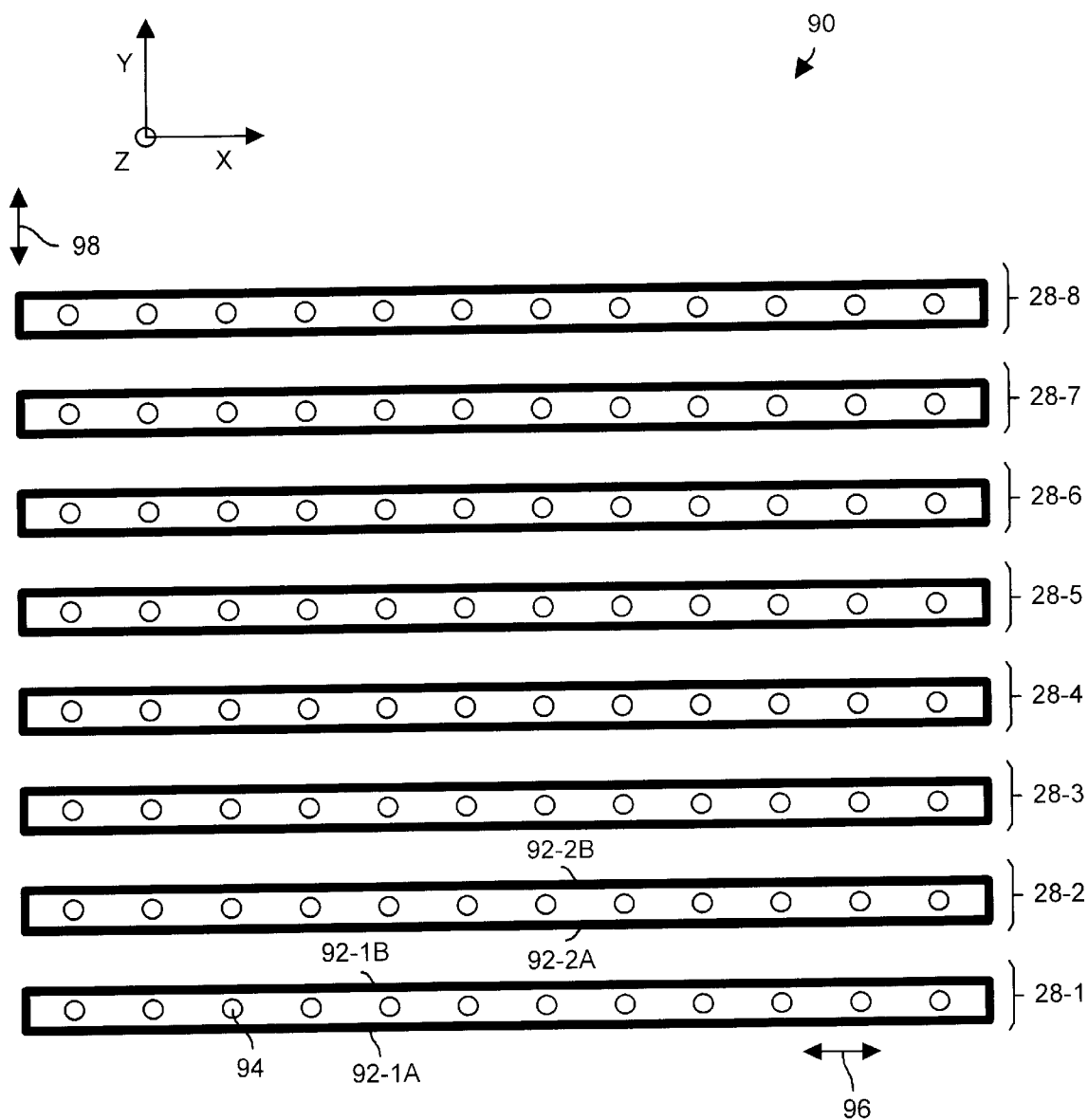
FIG. 6 is a cross-sectional view of a set of optical fiber ribbons which extend from a same location of a casing of the fiber optic backplane of FIG. 1.

FIG. 6 is a cross-sectional view of a column 90, or stack, of optical fiber ribbons 28 (e.g., the optical fiber ribbons 28-A of FIG. 1) formed by the manufacturing assembly 40 of FIG. 2. The column 90 provides a high-density grouping of optical fibers that extend from a single location of the support structure 44, i.e., the location 66-C of the support structure 44 (also see FIG. 3). As shown, each optical fiber ribbon 28 extends in the Z-direction and is substantially planar, or flat, in an X-direction 96. Each optical fiber ribbon 28 includes a bottom 92-A and a top 92-B formed by ribbon coatings 74. Between the bottom and top 92-A, 92-B reside a row of optical fibers 94 (e.g., 12 optical fibers viewed cross-sectionally in FIG. 6 and extending in the Z-direction). As shown, the optical fiber ribbons 28 align in a column 90 that extends substantially in a Y-direction that is substantially perpendicular to the X-direction. Once the optical fiber ribbons 28 have been formed, the manufacturer can complete the backplane assembly process by making either a flexible backplane as shown in FIG. 1 (which involves removing the optical fibers from the support structure 44, or a rigid backplane which involves continuing to use the support structure 44 as part of the rigid backplane.

It should be understood that the density of optical fibers 94 in the column 90 is far superior to the fiber density of the earlier described conventional backplane which has only a single ribbon (rather than multiple ribbons) extending from any particular location. Further details of how the manufacturer makes both the flexible and rigid forms of the backplane will now be provided with reference to FIG. 7.

Figure 7:
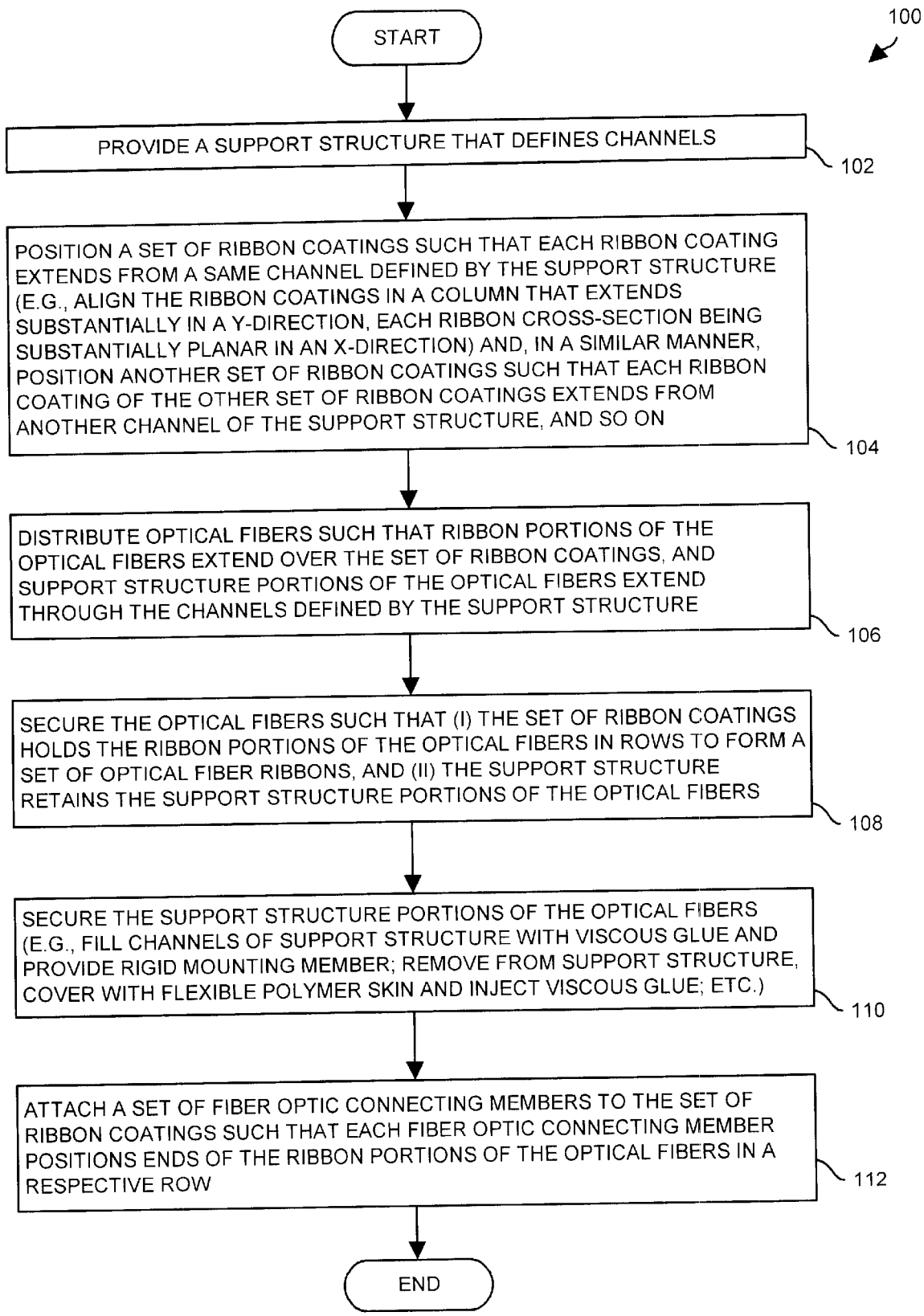
FIG. 7 is a procedure performed by a manufacturer to make a fiber optic backplane.

FIG. 7 shows a procedure 100 which is performed by a manufacturer to make a fiber optic backplane. In step 102, the manufacturer provides a support structure that defines channels. For example, see the support structure 44 of FIG. 3 which defines channels 64.

In step 104, the manufacturer positions a set of ribbon coatings such that each ribbon coating extends from a same channel defined by the support structure. For example, as shown in FIG. 4, the manufacturer places a ribbon coating 74 on each ribbon carrying surface 54 of a column 58 of the ribbon carrying structure 46. When the ribbon coatings 74 reside on the ribbon carrying structure 46 in this column 58 (e.g., column 58-A), each ribbon coating 74 extends from a same channel defined by the support structure (e.g., see location 66-C of FIG. 3). As part of step 104, the manufacturer places other set of ribbon coatings 74 in other columns 58 of the ribbon carrying structure 46 such that the other sets of ribbon coatings 74 extends from other locations of the support structure (e.g., see the locations 66-A, 66-B of FIG. 3).

In step 106, the manufacturer distributes and cuts optical fibers such that ribbon portions of the optical fibers extend over the set of ribbon coatings 74, and support structure portions of the optical fibers extend through the channels defined by the support structure (see channels 64 of the support structure 44 in FIG. 3). Preferably, the ribbon coatings 74 are sticky and hold the distributed optical fibers in place.

In step 108, the manufacturer secures the optical fibers such that the set of ribbon coatings 74 holds the ribbon portions of the optical fibers in rows to form a set of optical fiber ribbons (e.g., the set of optical fiber ribbons 28-A of FIG. 1). In one arrangement, the manufacturer applies additional ribbon coatings 74 so that the earlier provided ribbon coating 74 (ribbon bottoms) and the newly applied ribbon coatings 74 (ribbon tops) form sleeves around the distributed optical fibers. The ends of the ribbon coatings 74 can be fused together (e.g., by pressure, heat, glue, a combination thereof, etc.). In this step, the support structure continues to retain the support structure portions of the optical fibers.

In step 110, the manufacturer secures the support structure portions of the optical fibers. To make the rigid version of the backplane, the manufacturer seals the ends of the channels 66 with an elastomer seal, fills the channels 66 of the support structure 44 (see FIGS. 2 and 3) with viscous glue and provides a rigid mounting member (e.g., a rigid cover) to cover the channels 66.

To make the flexible backplane, the manufacturer also seals the ends of the channels 66 with an elastomer seal, and fills the channels 66 of the support structure 44 with viscous glue. After the viscous glue cures, the manufacturer removes the protected support structure portions of the optical fibers from the support structure 44. In some arrangements, an ejection mechanism, or pre-application of a non-stick coating to the support structure 44 assists in removal of the support structure portions of the optical fibers from the support structure 44. Optionally, the manufacturer stores the protected support structure portions of the optical fibers in a larger member (e.g., places the portions in a secondary molding and injects that secondary molding with more material to hide the portions in a larger unitary molding.

It should be understood that the viscous glue suspends the optical fibers and holds the optical fibers in place thus helping the optical fibers resist bending. There is no laminate that pulls the optical fibers down or allows the optical fibers to succumb to external forces as in the conventional fiber optic backplane. Rather, once the viscous glue is injected and cures, the optical fibers are protected. Accordingly, the tendency for the optical fibers to bend at the crossover points is eliminated and there is less light energy loss at those points. As a result, more optical fibers can cross over each other at a particular point in the backplanes of the invention than in conventional backplanes.

Preferably, the cured viscous glue is flexible at least in the locations where the ribbons attach in order to provide strain relief. Accordingly, there is little likelihood of damage to the optical fibers when the ribbons flex near the attachment points.

In step 112, the manufacturer attaches a set of fiber optic connecting members to the set of ribbon coatings 74 such that each fiber-optic connecting member positions ends of the ribbon portions of the optical fibers in a respective row (e.g., see connecting members 30 in FIG. 1). The connecting members enable the fiber optic backplane to form optical connections with other connecting members (e.g., connecting members of a circuit board having fiber optic components). The flexible fiber optic backplane is shown in FIG. 1. The rigid backplane is shown in FIG. 8, the details of which will now be more thoroughly discussed.

Figure 8:
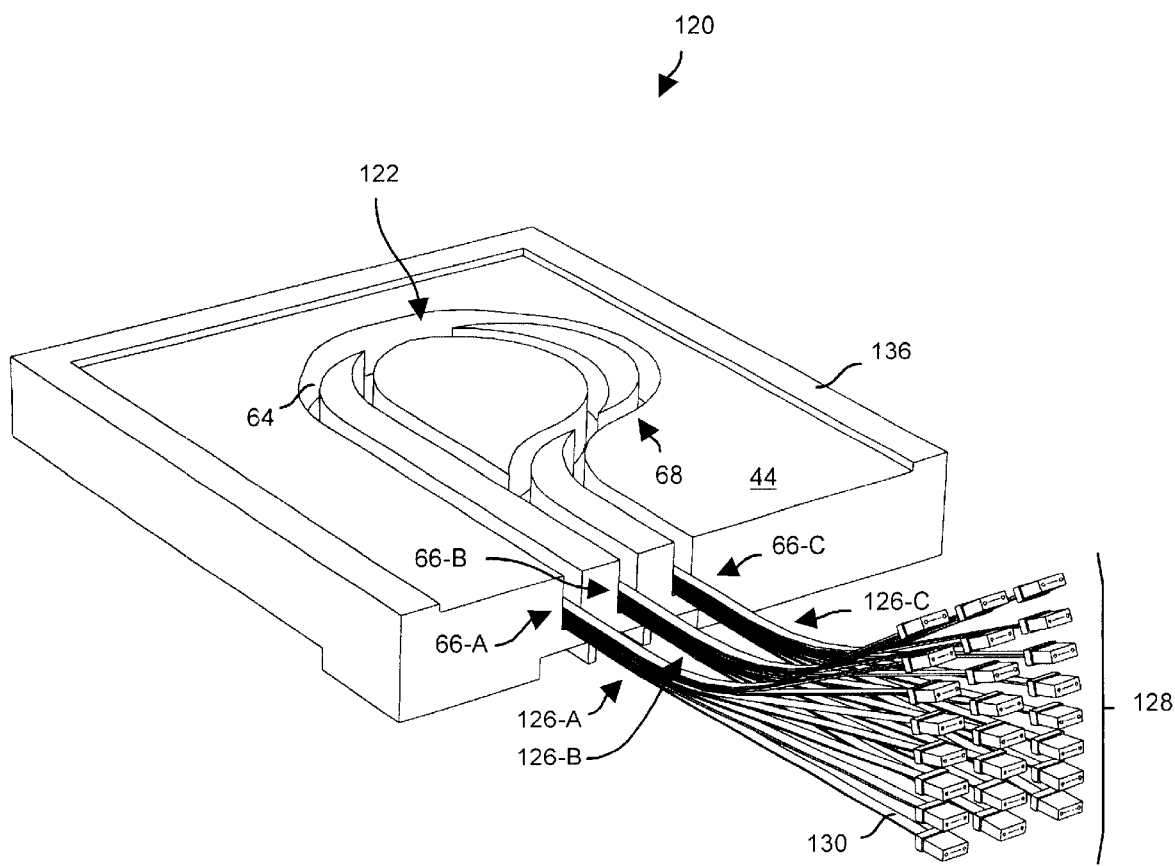
FIG. 8 is a perspective view of a rigid fiber optic backplane provided by the manufacturing assembly of FIG. 2.

FIG. 8 shows a rigid fiber optic backplane 120 which uses the support structure 44 of the manufacturing assembly 40 of FIG. 2. In addition to the support member 44 which defines channels 66 (also see FIG. 3), the backplane 120 includes sets of optical fiber ribbons 126, connecting members 128 and optical fibers. Each optical fiber ribbon 126 includes a sleeve 130 formed by ribbon coatings 74 (also see FIG. 4) that protects and holds together a row of the optical fibers.

As shown in FIG. 8, each set of optical fiber ribbons 126 attaches to the support member 44 at the same location 66. For example, the set of optical fiber ribbons 126-A attaches to the support member 44 at a location 66-A, and so on.

The channels 66 defined within the support member 44 having bend radii 68 large enough to prevent excessive light loss in the support member portions of the optical fibers. Accordingly, the support member 44, when filled with viscous glue (simply illustrated by the arrow 122 for simplicity and to better show the channels 64), is capable of carrying a large number of optical fibers and providing a large number of optical fiber crossovers with minimal light energy loss.

The support member 44 further defines a lip 136 around a periphery of the support member 44 in order to fit the support member 44 with another support member (e.g., a rigid cover) that protects the portions of optical fiber within the channels 64 and that covers the viscous glue 122. In one arrangement, the backplane 120 includes a solid but flexible glue (e.g., having a rubbery consistency) so that it does not flow out of the channels 64 but nevertheless enables the optical fibers to retain a lower stress state. Further details of the invention will now be provided with reference to FIG. 9.

Figure 9:
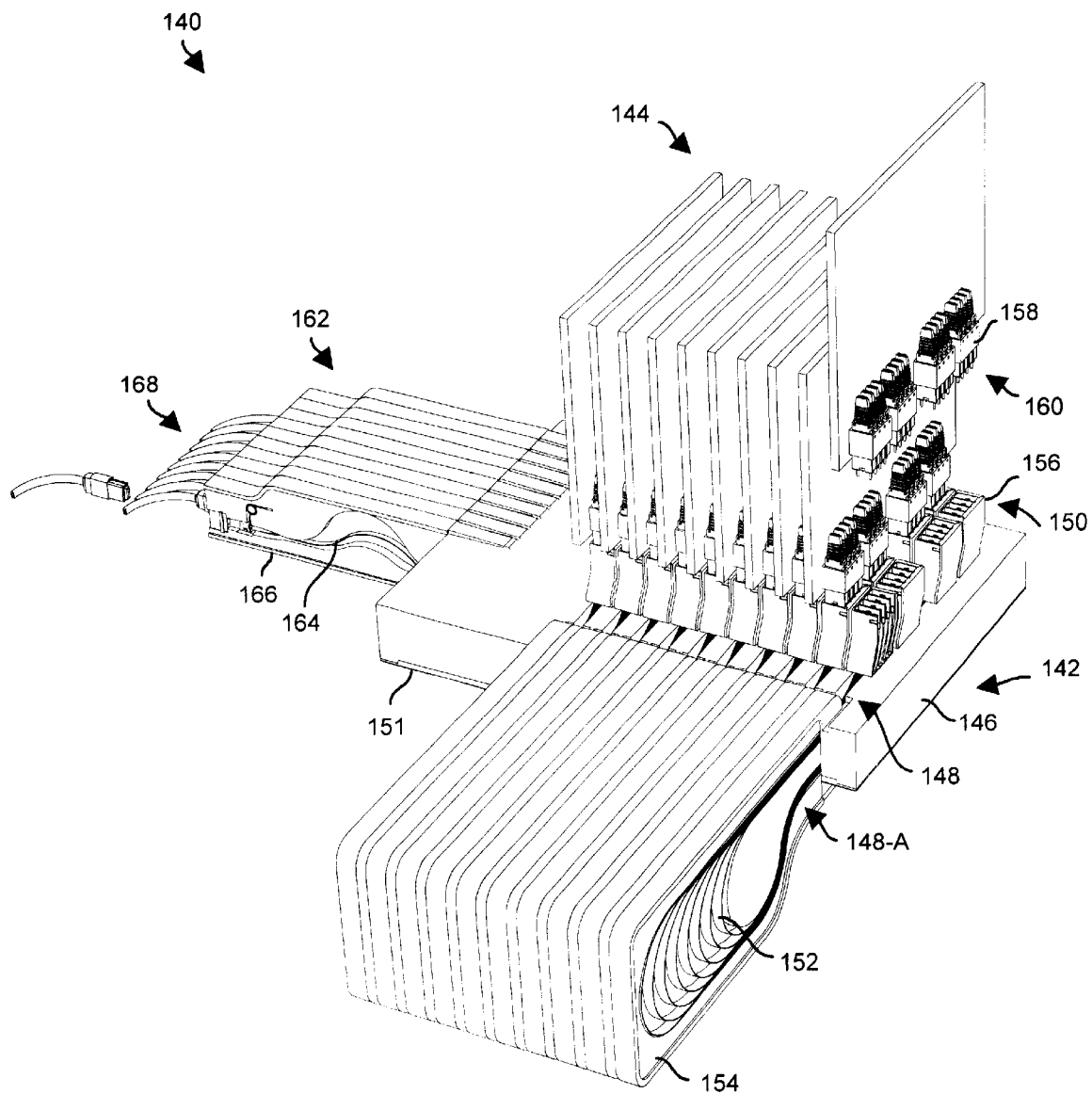
FIG. 9 is a perspective view of a fiber optic network assembly which uses a rigid fiber optic backplane.

FIG. 9 shows a fiber optic network assembly 140 which is suitable for use by the invention. The fiber-optic network assembly 140 includes a rigid fiber optic backplane 142 and a set of fiber optic circuit boards 144. The fiber optic backplane 142 is similar to the fiber optic backplane 120 of FIG. 8 but includes additional features. In particular, the fiber optic backplane 142 includes, among other things, a support structure 146 having sets of fiber optic ribbons 148 (e.g., see a set of fiber optic ribbons 148-A extending from a same location of the support structure 146), a set of connecting members 150 terminating the set of fiber optic ribbons 148, and a cover 151. Each fiber optic ribbon 148 includes a ribbon coating 152 that surrounds optical fibers within the fiber optic backplane 142.

The fiber optic network assembly further includes a set of ribbon supports 154, each of which supports and protects a set of fiber optic ribbons 148 extending from the same location of the support structure 146. Preferably, each ribbon support 154 fully covers a set of fiber optic ribbons 148. However, a side of a ribbon support 154 is left off in FIG. 9 to illustrate a configuration for the fiber optic ribbons 152 within the ribbon support 154. The individual ribbons preferably include slack as shown in FIG. 9. Such slack avoids the possibility that stresses within the backplane 142 or the support members will pull off connecting member 150 or damage ribbon 148. Additionally, such slack provides extra cable length in the event that a particular ribbon or cable requires maintenance (e.g., enables a technician to cut off a bad connecting member and replace it with another connecting member).

The fiber optic network assembly 140 further includes a set of connector housings 156 which mount to a rigid surface of the backplane 142. In one arrangement, the connector housings open along their sides to allow side installation of the fiber optic ribbons 152 and connecting members 150 of the backplane 142. Each circuit board 144 includes a set of connectors 158 of having corresponding connecting members 160 which form sets of optical connections with the connecting members 150 of the backplane 142 when that circuit board 144 installs onto the backplane 142. The rigid configuration of the backplane 142 provides a fixed mounting surface onto which each circuit board 144 can fasten and obtain support.

The fiber-optic network assembly 140 further includes a set of individual side connection assemblies 162. Each side connection assembly 162 includes an optical fiber ribbon 164 that forms part of the backplane 142, and a side connection support 166. As such, fiber optic cables 168 can plug into the side connection support 166 to form fiber optic connections with the optical fiber ribbon 164 in order to tap into the backplane 142. Further details of the backplane 142 will now be provided with reference to FIG. 10.

Figure 10:
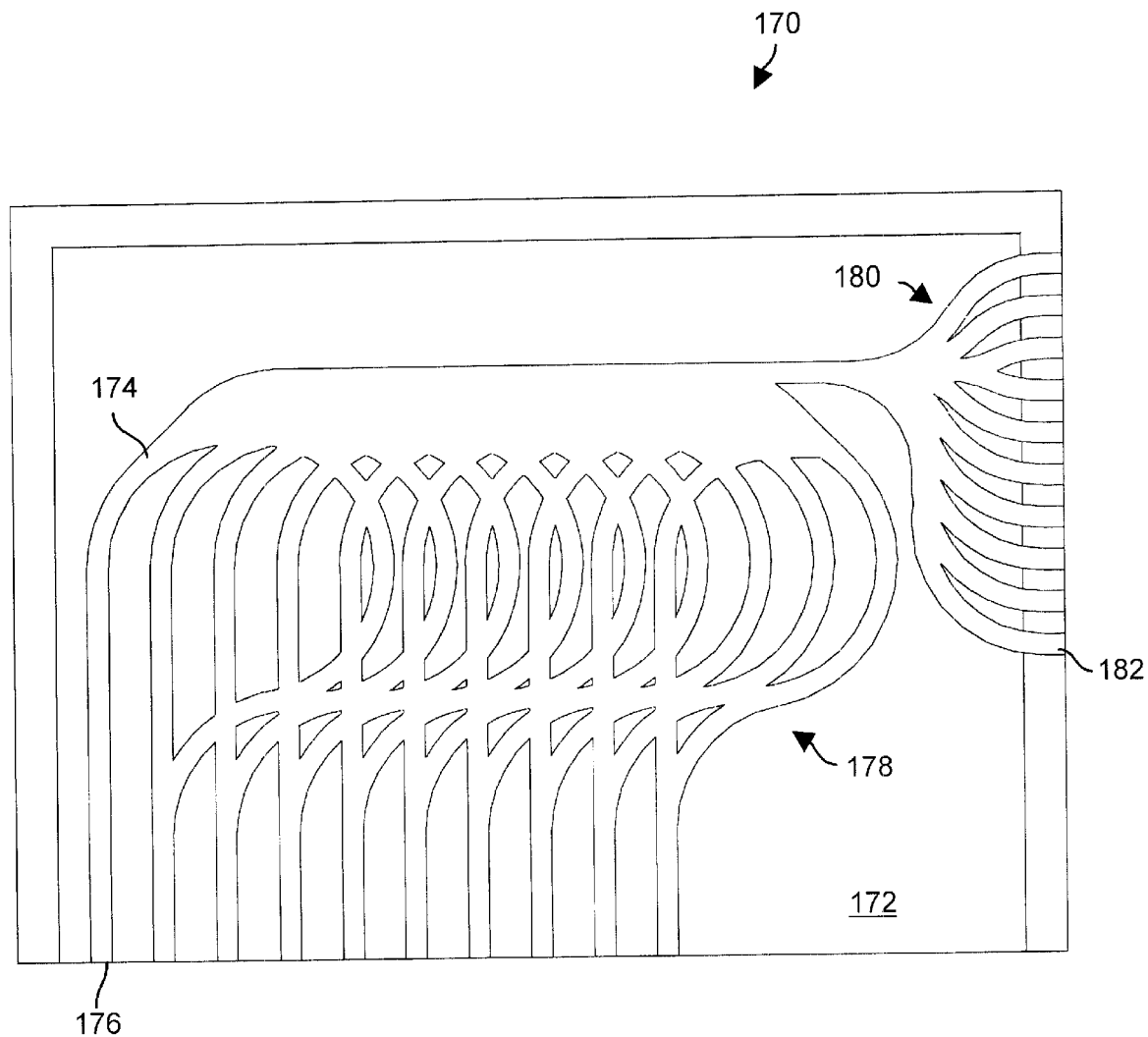
FIG. 10 is a top view of an alternative support structure to the support structure of FIG. 3 which is suitable for use by the manufacturing assembly of FIG. 2.

FIG. 10 shows a top view 170 of a support structure 172 which is suitable for use for making the backplane 142 of FIG. 9. The support structure 172 defines multiple channels 174 for receiving portions of fiber optic cable. The channels 174 run to locations 176 along an edge of the support structure 172 at which ribbon coatings attach to form optical fiber ribbons which extend from the support member 172 (e.g., see the set of optical fiber ribbons 148-A of FIG. 9). The channels 174 defined by the support structure 172 include bend radii 178 which are large enough to avoid excess light energy loss (e.g., bend radii greater than or equal to 26 millimeters).

The support structure 172 further includes an extra set of channels 180 leading to locations 182 along a different side of the support structure 172 for forming the side connections 164 (e.g., see side connections 164 of FIG. 9). During the manufacturing process, the manufacturing assembly 40 of FIG. 2 runs fiber optic cables through the extra channels 180 in order to form such side connections 164.

It should be understood that the support structure 172 is suitable for use in making backplanes with several sets of ribbons extending therefrom. The channels 174 hold the optical fibers thus allowing many optical fiber runs through the support structure 172. Viscous glue injected into the channels 174 suspends the optical fibers and holds the optical fibers in place. Accordingly, there is no substantial bending of the optical fibers that could provide significant light energy loss as in the conventional backplane. In particular, there is no laminate that can pull down the top fibers of cross-over or opportunity for an outside force to deform the optical fibers or move the optical fibers into a high stress state as in the conventional backplane.

It should be further understood that the defined channel height is one factor in preventing optical fiber bending. Additionally, the number of fibers that can cross-over each other at any particular point is essentially limited by the height of the channels 174. Accordingly, the support structure 172 is well-suited for manufacturing high density fiber optic backplanes.

Figure 11:
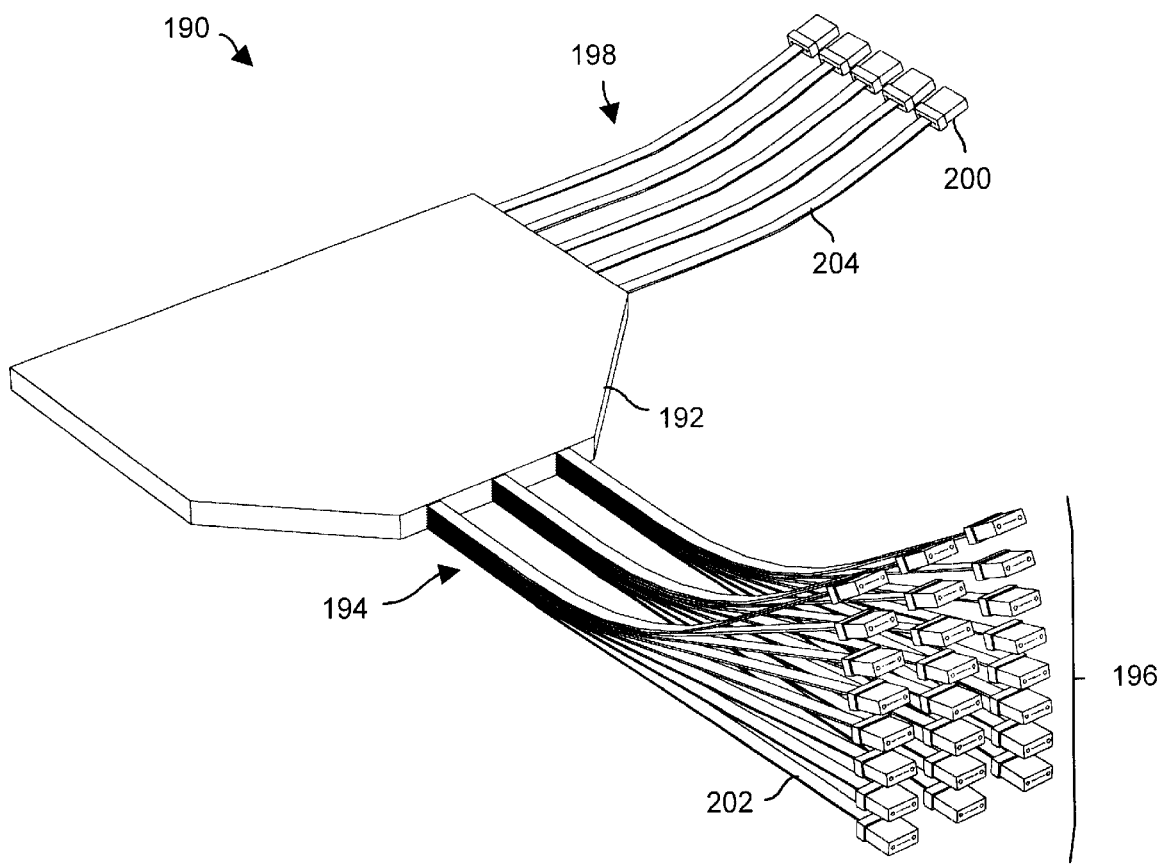
FIG. 11 is a perspective view of an alternative flexible fiber optic backplane to that of FIG. 1.

FIG. 11 shows a flexible fiber optic backplane 190 which is similar to the rigid fiber optic backplane described in connection with FIGS. 9 and 10, in that the flexible fiber optic backplane has side connections as well. The flexible fiber optic backplane 190 includes, among other things, a flexible central casing 192, sets of fiber optic ribbons 194 respectively extending from locations along and edge of the central casing 192, connecting members terminating the fiber optic ribbons 194, side connection ribbons 198, and connecting members 200 terminating the side connection ribbons 198. Each fiber optic ribbon 194 includes a ribbon coating 202 which covers optical fiber portions of that fiber optic ribbon 194 and holds those optical fiber portions in place. Similarly, each side connection ribbon 198 includes a ribbon coating 204 which covers optical fiber portions of that side connection ribbon 198 and holds those optical fiber portions in place.

Figure 12:
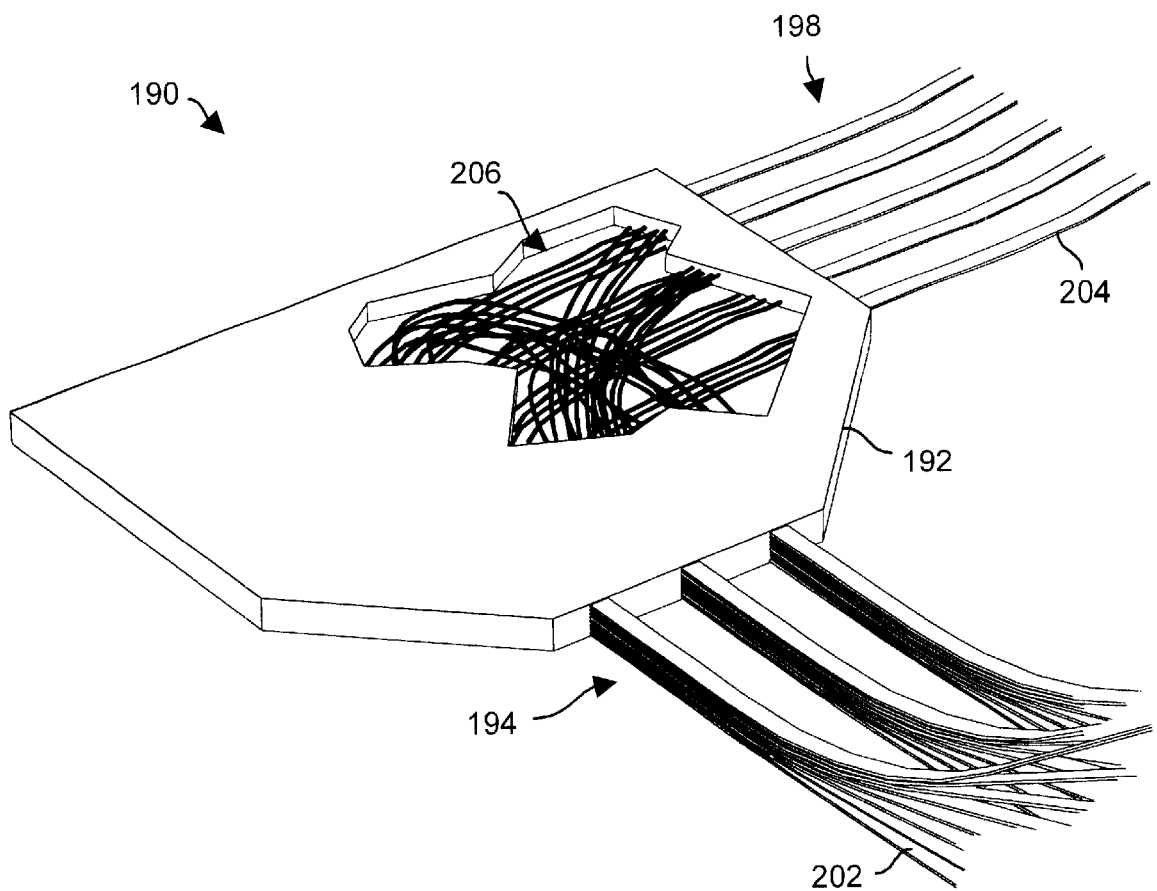
FIG. 12 is a perspective view of particular details of the alternative flexible fiber optic backplane of FIG. 11.

FIG. 12 shows further details of the fiber optic backplane 190. In particular, in FIG. 12, the optical fibers 206 of the fiber optic backplane 190 are visible through a cutaway section of the casing 192. Additionally, the connecting members 196, 200 have not yet been attached.

The invention is directed to fiber optic connection techniques using a fiber optic backplane having a casing portion (e.g., a flexible skin, a rigid member with a cover, etc.) and multiple fiber optic ribbons that extend from the same location of the casing portion. Accordingly, the resulting backplane can have a flexible form that clips to or hangs from a rigid board in a manner similar to that of conventional fiber optic backplanes. Alternatively, the resulting backplane can have a rigid form that provides a rigid surface onto which other components can mount. Such techniques are well-suited for higher density connections and can be implemented without significant light energy loss. The features of the invention, as described above, may be employed in computer systems, and related assemblies, components and procedures such as those of Teradyne, Inc. of Boston, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the backplanes 20 (see FIG. 1), 120 (see FIG. 8), and 190 (see FIGS. 11 and 12) were shown as including three sets of optical fiber ribbons that extend from a central casing by way of example only. Other numbers of sets are suitable as well (e.g., four, six, eight, etc.). By way of example, the support structure 170 of FIG. 10 includes 10 locations 176 for 10 sets of optical fiber ribbons, each set being capable of including multiple ribbons (also see column 90 of ribbons in FIG. 6).

Additionally, it should be understood that each optical fiber ribbon (see ribbon 28 in FIG. 6) was described as being formed by combining (e.g., fusing together using pressure, heat, etc.) a bottom ribbon coating 74 (a surface 92-B), a row of optical fibers 92 and top ribbon coating 74 (a surface 92-A) by way of example only. Other ribbon forming techniques are suitable for use as well. For example, each ribbon 28 can be formed by laying out a bottom ribbon coating 74 and the optical fibers 92, and then applying a paste or epoxy over the optical fibers 92 which hardens into a flexible rubber-like material.

Furthermore, it should be understood that the arrangement of side connections 162 of the backplane 142 were shown at 90 degrees to the sets of ribbons 148 by way of example only. In other arrangements, the side connections 162 are oriented in different locations. In one arrangement, the side connections 162 are disposed on the back of the backplane, i.e., on the side opposite the sets of ribbons 148. This arrangement can be positioned within a cabinet that allows both front and rear access. For the arrangement in which the side connections 162 are disposed on the back of the backplane rather than the side (i.e., rather than at 90 degrees to the sets of ribbons 148), the ribbons for side connections 162 preferably extend from the backplane central casing from the back rather than the side. For example, the support structure 170 of FIG. 10 would have the extra channels 180 extending from the side (i.e., the back) opposite the side of locations 176. Similarly, the backplane 190 of FIG. 11 would have the extra connections 198 extending from the side (i.e., the back) opposite the sets of ribbons 194. In other arrangements, the fiber optic backplanes have ribbons extending in several directions (i.e., in the X, Y and Z directions). Such modifications and enhancements are intended to be within the scope of the invention.

Additionally, it should be understood that the support structures were described above as being injected with a viscous glue (e.g., a viscous polymer) that suspends and holds the optical fibers in positions of a low stress and suitable bend radii that avoids excessive light energy loss. Other substances and materials are suitable for use as well such as a silicon-type resin that injects into the support structure channels and that cures into a more rigid solid, and the like.

What is claimed is:

1. A fiber optic backplane, comprising:
   multiple optical fibers;
   a set of ribbon coatings, each ribbon coating of the set of ribbon coatings holding ribbon portions of at least two of the multiple optical fibers in a row to form a set of optical fiber ribbons; and
   a casing that holds casing portions of the multiple optical fibers, each ribbon coating of the set of ribbon coatings attaching to the casing at a same location of the casing such that the formed set of optical fiber ribbons extends from a single hole defined by the casing, and wherein the set of ribbon coatings extends in a column from the single hole defined by the casing.

2. The fiber optic backplane of claim 1 wherein each optical fiber ribbon includes at least two of the multiple optical fibers which reside in a row that extends substantially in a first direction, and wherein the set of ribbon coatings extends in the column from the single hole defined by the case such that the column extends in a second direction that is substantially perpendicular to the first direction.

3. The fiber optic backplane of claim 1, further comprising:
   another set of ribbon coatings, each ribbon coating of the other set of ribbon coatings holding other ribbon portions of at least two of the multiple optical fibers in a row to form another set of optical fiber ribbons, each ribbon coating of the other set of ribbon coatings attaching to the casing at another location of the casing such that the other formed set of optical fiber ribbons extends from another hole defined by the casing, and wherein the other set of ribbon coatings extends in another column from the other hole defined by the casing.

4. The fiber optic backplane of claim 1 wherein the casing includes a flexible polymer skin that is capable of elastically deforming under stress.

5. The fiber optic backplane of claim 4, further comprising:
   a viscous glue which is retained around portions of the optical fibers by the flexible polymer skin of the casing.

6. The fiber optic backplane of claim 1 wherein the casing includes a rigid member that covers the casing portions of the optical fibers.

7. The fiber optic backplane of claim 6 wherein the rigid member of the casing defines a mounting surface onto which fiber optic components are capable of rigidly mounting.

8. The fiber optic backplane of claim 1, further comprising:
   a set of fiber optic connecting members coupled to the set of ribbon coatings, each fiber optic connecting member positioning ends of the ribbon portions of the optical fibers in a respective row.

9. A method for forming a fiber optic backplane, comprising the steps of:
   providing a support structure that defines channels;
   positioning a set of ribbon coatings such that each ribbon coating of the set of ribbon coatings extends from a same channel defined by the support structure;
   distributing optical fibers such that ribbon portions of the optical fibers extend over the set of ribbon coatings, and support structure portions of the optical fibers extend through the channels defined by the support structure; and
   securing the optical fibers such that (i) each ribbon coating of the set of ribbon coatings holds the ribbon portions of at least two of the optical fibers in a row to form a set of optical fiber ribbons that extend in a column from the same channel defined by the support structure, and (ii) the support structure retains the support structure portions of the optical fibers.

10. The method of claim 9 wherein each optical fiber ribbon includes at least two optical fibers which reside in a row that extends substantially in first direction, and wherein the step of positioning the set of ribbon coatings includes the step of:
    aligning the ribbon coatings in a column that extends in a second direction that is substantially perpendicular to the first direction.

11. The method of claim 9, further comprising the step of:
    positioning another set of ribbon coatings such that each ribbon coating of the other set of ribbon coatings extends from another channel defined by the support structure, wherein the step of distributing the optical fibers includes distributing other ribbon portions of the optical fibers over the other set of ribbon coatings, and wherein the step of securing the optical fibers includes fastening the other set of ribbon coatings such that each ribbon coating of the other set of ribbon coatings holds the other ribbon portions of at least two of the optical fibers in a row to form another set of optical fiber ribbons that extends in a column from the other channel defined by the support structure.

12. The method of claim 9, further comprising the steps of:
    removing the support structure portions of the optical fibers from the support structure that defines the channels in order to expose the support structure portions; and
    covering the support structure portions of the optical fibers with a casing which includes a flexible polymer skin that is capable of elastically deforming under stress.

13. The method of claim 12, further comprising the step of:
    prior to removing the support structure portions of the optical fibers from the support structure, injecting a viscous glue into the support structure such that the viscous glue is retained around the support structure portions of the optical fibers.

14. The method of claim 9, further comprising the step of:
    filling the channels defined by the support structure with a viscous glue such that the viscous glue is retained around the support structure portions of the optical fibers by the support structure.

15. The method of claim 14 wherein the step of providing the support structure includes the step of:

providing a rigid member that defines a mounting surface onto which fiber optic components are capable of rigidly mounting.

16. The method of claim 9, further comprising the step of:

attaching a set of fiber optic connecting members to the set of ribbon coatings such that each fiber optic connecting member positions ends of the ribbon portions of the optical fibers in a respective row.

17. A fiber optic network assembly, comprising:

fiber optic circuit boards, each fiber optic circuit board having a set of fiber optic circuit board connecting members; and a fiber optic backplane that connects with the fiber optic circuit boards, the fiber optic backplane including:

multiple optical fibers, a set of ribbon coatings, each ribbon coating of the set of ribbon coatings holding ribbon portions of at least two of the multiple optical fibers in a row to form a set of optical fiber ribbons, a casing that holds casing portions of the multiple optical fibers, each ribbon coating of the set of ribbon coatings attaching to the casing at a same location of the casing such that the formed set of optical fiber ribbons extends from a single hole defined by the casing, the set of ribbon coatings extending in a column from the single hole defined by the casing, and a set of fiber optic backplane connecting members coupled to the set of ribbon coatings, each fiber optic backplane connecting member positioning ends of the ribbon portions of the optical fibers in a respective row and being capable of forming a set of optical connections with a corresponding fiber optic circuit board connecting member.

* * * * *